(12) United States Patent
Krah

(10) Patent No.: US 7,628,056 B2
(45) Date of Patent: Dec. 8, 2009

(54) INTERNAL PRESSURE TESTING APPARATUS AND METHOD FOR PIPE

(75) Inventor: Karl-Heinz Krah, Daaden-Bierdorf (DE)

(73) Assignee: Karl-Heinz Krah GmbH, Daaden (DE)

( * ) Notice: Subject to any disclaimer, the term of this patent is extended or adjusted under 35 U.S.C. 154(b) by 0 days.

(21) Appl. No.: 11/487,606

(22) Filed: Jul. 17, 2006

(65) Prior Publication Data
US 2007/0220957 A1 Sep. 27, 2007

Related U.S. Application Data

(60) Provisional application No. 60/784,464, filed on Mar. 22, 2006, provisional application No. 60/815,249, filed on Jun. 20, 2006.

(51) Int. Cl.
G01M 3/04 (2006.01)
(52) U.S. Cl. .......................... 73/49.5; 73/49.6
(58) Field of Classification Search .............. 73/46, 73/49.5, 49.6, 49.8
See application file for complete search history.

(56) References Cited

U.S. PATENT DOCUMENTS

| | | | |
|---|---|---|---|
| 2,396,380 A | 3/1946 | Longley | |
| 2,578,728 A * | 12/1951 | Musser | 73/49.5 |
| 2,618,963 A * | 11/1952 | Wagenhals | 73/49.5 |
| 2,873,764 A * | 2/1959 | Lombard et al. | 138/90 |
| 3,331,238 A * | 7/1967 | Kost et al. | 73/49.5 |
| 3,618,366 A * | 11/1971 | Pauls et al. | 73/49.5 |
| 3,731,525 A | 5/1973 | Suter | |
| 3,884,070 A * | 5/1975 | Windle | 73/49.8 |
| 4,061,015 A | 12/1977 | Fish | |
| 4,067,228 A * | 1/1978 | Elle et al. | 73/49.1 |
| 4,127,026 A * | 11/1978 | Battafarano | 73/49.5 |
| 4,192,177 A * | 3/1980 | Crickard et al. | 73/49.5 |
| 4,382,379 A * | 5/1983 | Kelly | 73/46 |
| 4,548,069 A * | 10/1985 | Nousak | 73/49.5 |
| 4,646,561 A * | 3/1987 | Toelke | 73/49.5 |
| 4,852,393 A | 8/1989 | Pate et al. | |
| 4,858,464 A * | 8/1989 | Miller et al. | 73/49.5 |
| 4,876,884 A | 10/1989 | Jansch | |
| 5,065,617 A * | 11/1991 | Toelke | 73/49.8 |

(Continued)

FOREIGN PATENT DOCUMENTS

GB 2242530 A * 10/1991

(Continued)

*Primary Examiner*—John Fitzgerald
(74) *Attorney, Agent, or Firm*—Roylance, Abrams, Berdo & Goodman, L.L.P.

(57) ABSTRACT

A pressure testing apparatus is provided for internally pressure testing pipe. A mandrel is secured to a frame and is adapted to receive a pipe thereon such that a gap exists between an outer surface of the mandrel and an inner surface of the pipe. A first end cap is disposed on an outer surface proximal a first end of the mandrel. A second end cap is connected to a second end of the mandrel. First and second seal members are disposed between the first and second end caps and the first and second pipe ends, respectively, such that the first and second seal members abut respective ends of the pipe disposed on the mandrel. A line is in fluid communication with the gap to fill the gap with a testing fluid.

32 Claims, 5 Drawing Sheets

U.S. PATENT DOCUMENTS

| | | | |
|---|---|---|---|
| 5,377,530 A * | 1/1995 | Allen et al. | 73/49.5 |
| 6,430,990 B1 | 8/2002 | Mallet | |
| 7,395,695 B2 | 7/2008 | Carson | |
| 2007/0157707 A1 * | 7/2007 | Garcia Gomez | 73/49.5 |

FOREIGN PATENT DOCUMENTS

| | | |
|---|---|---|
| WO | WO 2005/085790 | 9/2005 |

* cited by examiner

INTERNAL PRESSURE TESTING APPARATUS AND METHOD FOR PIPE

CROSS REFERENCE TO RELATED APPLICATIONS

This application claims the benefit under 35 U.S.C. § 119 (e) of provisional patent application Ser. Nos. 60/784,464, filed Mar. 22, 2006 and 60/815,249, filed Jun. 22, 2006, both of which are hereby incorporated by reference in their entirety.

FIELD OF THE INVENTION

The invention relates to apparatus for and a method of internally pressure testing pipe. More particularly, the invention relates to an apparatus that internally pressure tests large diameter pipe. Still more particularly, the invention relates to a method of internally pressure testing large diameter pipe.

BACKGROUND OF THE INVENTION

Pressure testing of pipe is generally required prior to the pipe being put into service. Various standards provide regulations regarding how the particular pipe is to be tested. For example, regulations require each pipe of a large diameter pressure pipe production lot to endure a specified pressure test.

Typically, large diameter pipe undergoes hydraulic testing in which the pipe is completely filled with a hydraulic testing liquid, such as water. One disadvantage of this hydraulic testing procedure is that a large quantity of water is required to fill the interior of the pipe. Furthermore, adequate drainage must be provided for the large amount of the hydraulic testing liquid following completion of the test. Additionally, filling and emptying the pipe with and of the hydraulic testing liquid is a time consuming process. Accordingly, a need exists for internal pressure testing for pipe that reduces the volume of testing medium required, as well as providing for more efficient pipe testing.

Another disadvantage associated with filling the interior of the pipe with a hydraulic testing liquid is the considerable weight of the pipe and testing liquid that must be supported. Such weight requires a large testing apparatus that is able to support such heavy loads, and results in an extremely expensive and elaborate testing apparatus. Accordingly, a need exists for internal pressure testing apparatus for pipe that reduces the testing weight of the pipe, as well as providing a more simple testing apparatus.

A disadvantage associated with pneumatic pressure testing of pipe is the potential for an explosion should the pipe fail the pressure test. Due to the large pressures involved and the compressibility of gas, a resulting explosion is not only dangerous, but may be fatal to test personnel. Hydraulic tests are generally not dangerous but may result in large quantities of the testing medium leaking out of the pipe, thereby requiring considerable clean-up efforts. In both testing situations, the test apparatus is often housed in an enclosure to protect test personnel and to minimize damage and leakage caused by a failed pipe. The test enclosure further increases the costs and difficulty of conducting the internal pressure testing of pipe. Accordingly, a need exists for internal pressure testing apparatus for pipe that substantially eliminates the danger and leakage cleanup associated with pipe that fails during pressure testing.

Another disadvantage associated with pressure testing that requires substantially the entire interior volume of the pipe to be filled with the testing medium is the large force that must be accommodated by the end caps sealing both ends of the pipe. Being able to withstand large forces requires the end caps to be bulky and unwieldy, thereby further increasing the difficulty of performing such internal pressure testing of pipe. Accordingly, a need exists for internal pressure testing of pipe that reduces the forces acting on the pipe end caps.

Apparatus exists for internal pressure testing of pipe that includes disposing the pipe to be tested over a center tube to reduce the required volume of the testing medium. However, many such apparatus dispose the end caps within the pipe, such that the entirety of the pipe is not subjected to the internal pressure testing. Accordingly, a need exists for internal pressure testing of pipe in which the end caps do not reduce the internal testing area of the pipe.

Thus, there is a continuing need to provide improved assemblies for and methods of internally pressure testing pipe.

SUMMARY OF THE INVENTION

Accordingly, an aspect of the present invention is to provide an apparatus for internally pressure testing pipe that substantially reduces the required volume of the testing medium, thereby providing a safer and more efficient testing procedure.

Accordingly, another aspect of the present invention is to provide an apparatus for internally pressure testing pipe in which the end caps do not reduce the internal testing area of the pipe, thereby ensuring that the entire interior of the pipe is subjected to the internal pressure testing.

In accordance with one exemplary embodiment of the present invention, an apparatus is provided for internally pressure testing pipe. A mandrel is secured to a frame and is adapted to receive a pipe thereon such that a gap exists between an outer surface of the mandrel and an inner surface of the pipe. A first end cap is disposed on an outer surface proximal a first end of the mandrel. A second end cap is connected to a second end of the mandrel. First and second seal members are disposed between the first and second end caps and the first and second pipe ends, respectively, such that the first and second seal members abut respective ends of the pipe disposed on the mandrel. A line is in fluid communication with the gap to fill the gap with a testing fluid.

In accordance with another exemplary embodiment of the present invention, a method of internally pressure testing pipe is provided. A pipe to be tested is disposed on an outer surface of a mandrel. The pipe is positioned to abut a first sealing member disposed proximal a first end of the mandrel. A second end cap is connected to a second end of the mandrel such that a second sealing member is disposed between the second end cap and a second end of the pipe, and the second sealing member abuts the second end of the pipe. The first and second ends of the pipe are hydraulically sealed by sending hydraulic fluid to a hydraulic sealing member connected to the first end cap to move the first end cap and the first sealing member into tight engagement with the first end of the pipe, thereby sealing the first and second ends of the pipe. A gap between the outer surface of the sleeve and an inner surface of the pipe is filled with a pressurized testing fluid to internally pressure test the pipe.

Other advantages and salient features of the invention will become apparent from the following detailed description, which, taken in conjunction with the annexed drawings, discloses preferred embodiments of the invention.

BRIEF DESCRIPTION OF THE DRAWINGS

Referring now to the drawings that form a part of the original disclosure.

Throughout the drawings, like reference numerals will be understood to refer to like parts, components and structures.

DETAILED DESCRIPTION OF THE INVENTION

As seen in FIGS. 1-7, the present invention relates to apparatuses for and methods of internally pressure testing pipe. A mandrel 21 is secured to a frame 11 and is adapted to receive a pipe 31, such as the pipe shown in FIG. 3, thereon such that a gap 33 exists between an outer surface 23 of the mandrel and an inner surface 35 of the pipe. First and second end caps 41 and 51 seal first and second ends 37 and 39 of the pipe 31 disposed on the mandrel 21. First and second seal members 43 and 53 are disposed between the first and second end caps 41 and 51 and the first and second pipe ends 37 and 39, respectively, such that the first and second seal members abut respective ends of the pipe disposed on the mandrel 21. A testing line 61 is in fluid communication with the gap 33 to fill the gap with a testing fluid.

Figure 1:
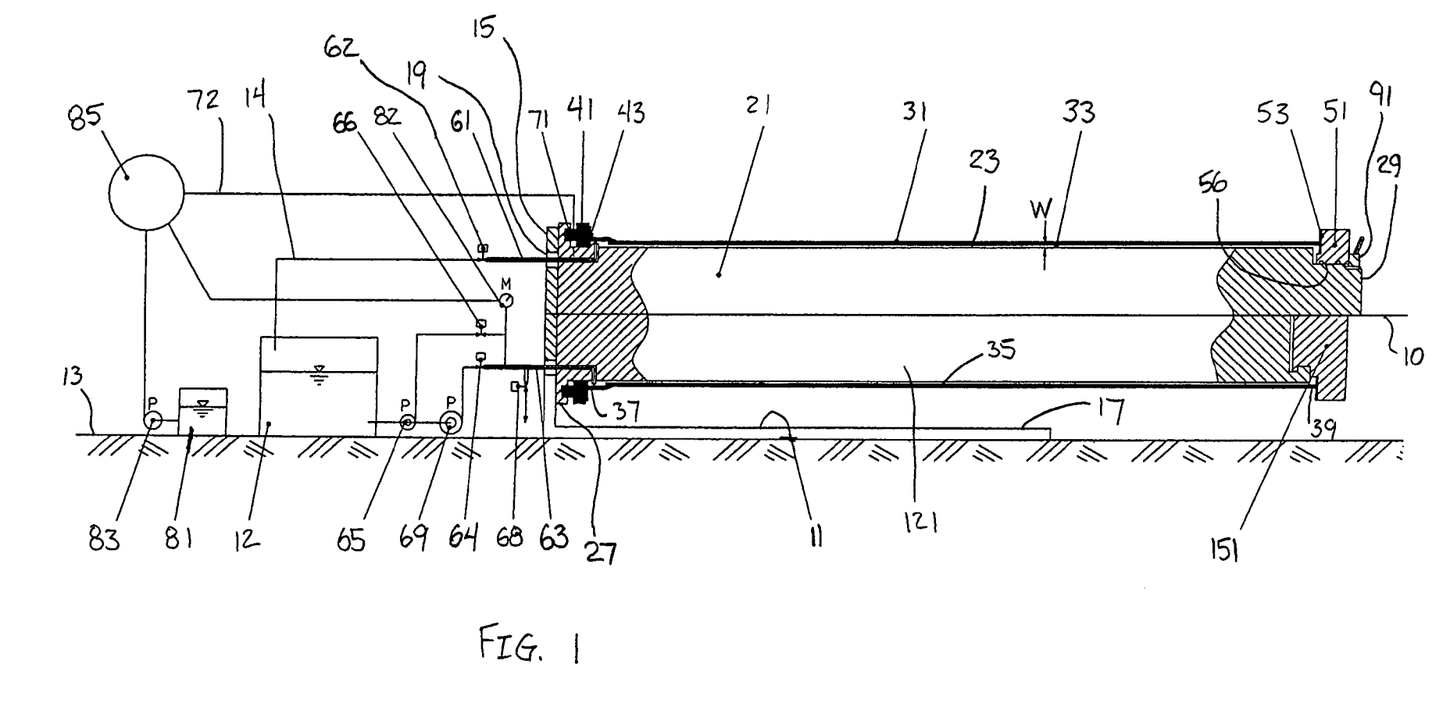
FIG. 1 is a front elevational view in partial cross-section of the testing apparatus of the present invention including two exemplary embodiments of sealing an end of the testing apparatus.

The mandrel 21 is secured to a frame 11, which is in turn secured to a support 13, such as a floor. As shown in FIG. 1, the frame is substantially L-shaped and has a first leg 15 extending substantially perpendicularly from a second leg 17. The second leg 17 is secured to the support 13 to provide a rigid and stable frame adapted to support the weight of the pipe during testing. The mandrel 21 is secured to the first leg 15 of the frame 11. Openings 19 in the frame 11 facilitate passing lines therethrough to supply the test medium to the gap 33 between the mandrel 21 and the pipe 31. Preferably, the mandrel 21 is releasably secured to the frame 11 such that the mandrel is replaceable. A mandrel 21 having an outer diameter suitable for the diameter of the pipe 31 to be tested is connected to the frame 11. Preferably, the mandrel 21 is selected such that the gap 33 between the inner surface 35 of the pipe 31 and the outer surface 23 of the mandrel 21 has a width "W", for example, that is approximately 5% of the inner diameter of the pipe 31 to be tested, or any other suitable width depending upon testing requirements. Preferably, the frame 11 and the mandrel 21 are made of steel, such as stainless steel.

Figure 2:
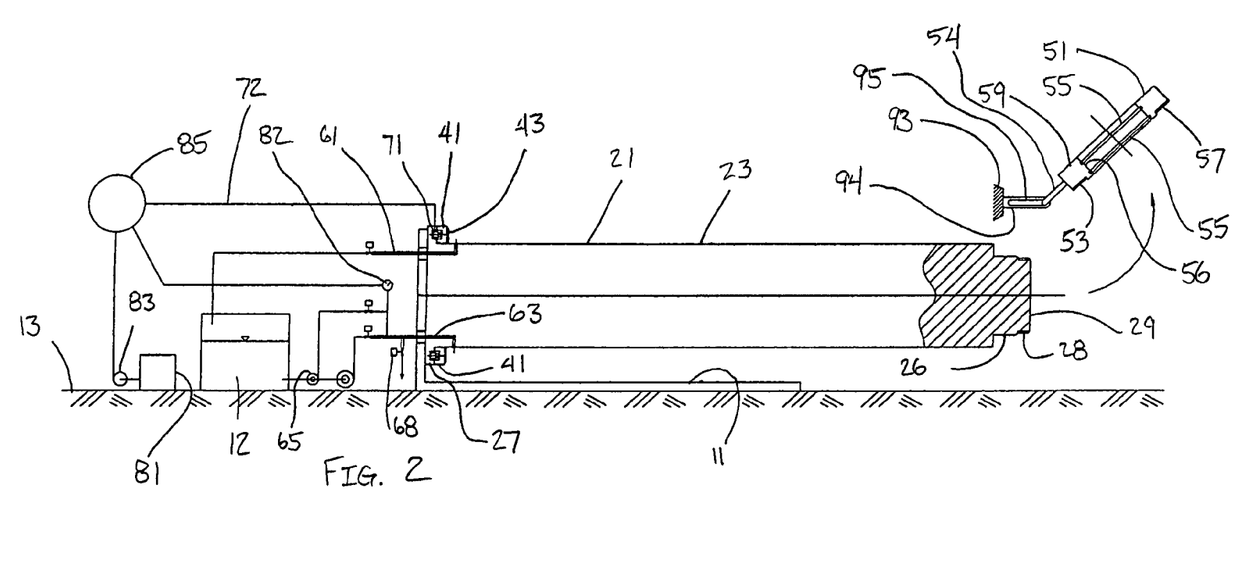
FIG. 2 is a front elevational view in partial cross-section of the testing apparatus of a first exemplary embodiment of the present invention.
Figure 5:
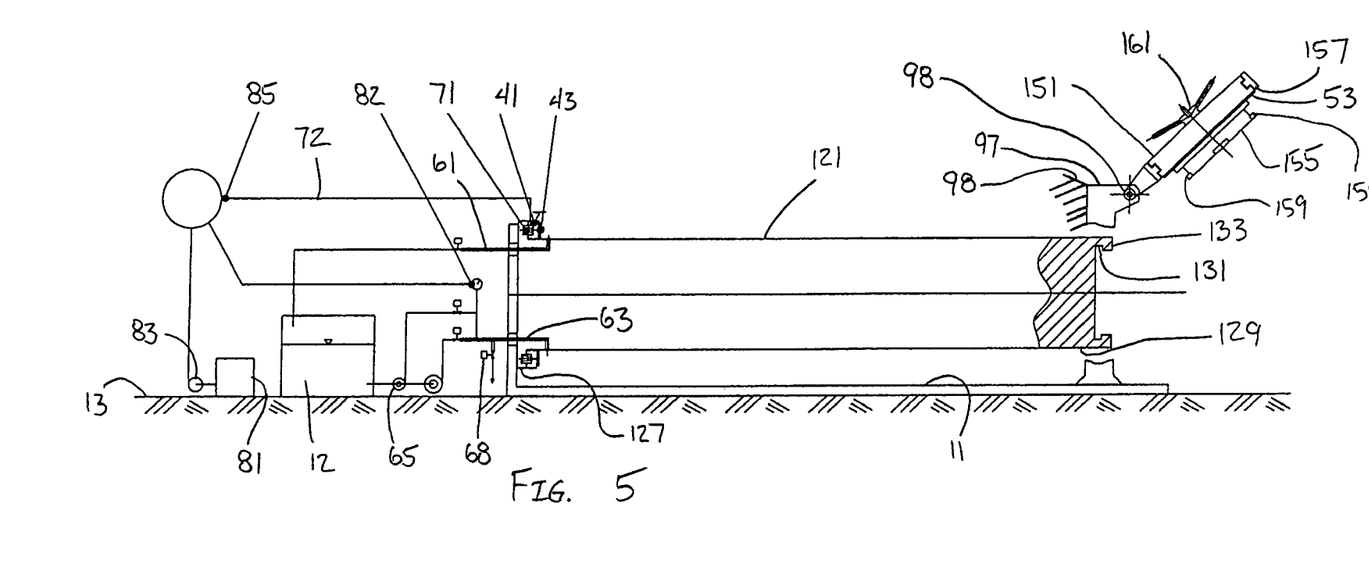
FIG. 5 is a front elevational view in partial cross-section of the testing apparatus of a second exemplary embodiment of the present invention.

A first end cap 41 is disposed on an outer surface proximal a first end 27 of the mandrel 21. Preferably, the first end 27 of the mandrel is a flange, as shown in FIGS. 1, 2 and 5 to facilitate forming a seal at the first end 37 of the pipe 31. A first seal member 43 is disposed between the first end cap 41 and the first end 37 of the pipe 31. Preferably, the first end cap 41 is made of metal.

Figure 1A:
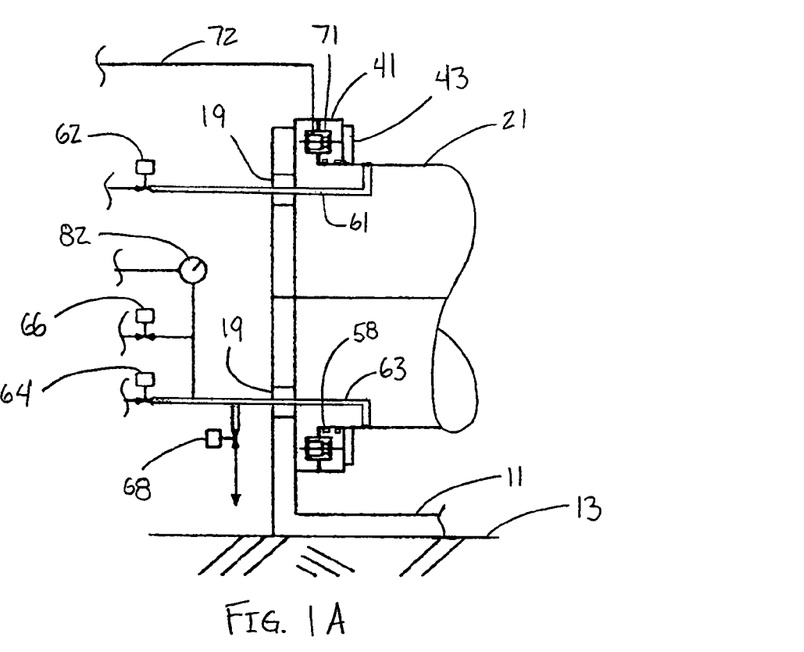
FIGS. 1A and 1B are exploded elevational views of a first end of a mandrel of FIGS. 2 and 1, respectively, showing movement of a hydraulic sealing member.
Figure 1B:
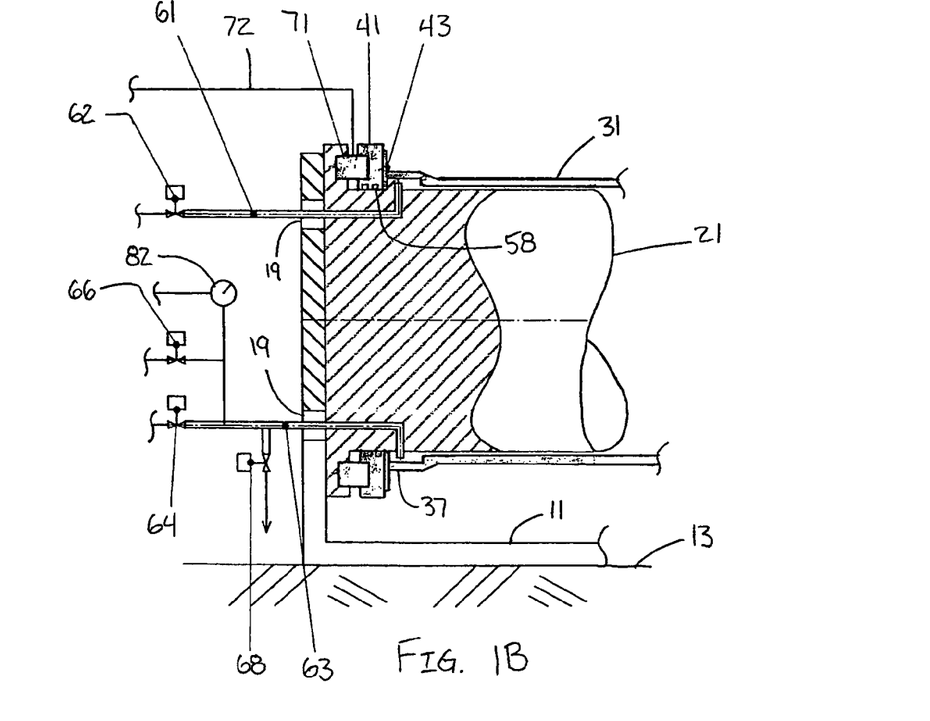

A hydraulic sealing member 71 is axially movably disposed between the first end 27 of the mandrel and the first end cap 41. The hydraulic sealing member 71 is spaced from the outer surface 23 of the mandrel, as shown in FIG. 1, thereby facilitating axial movement of the hydraulic sealing member 71. FIG. 1A shows an initial position of the hydraulic sealing member 71, and FIG. 1B shows a second position in which the hydraulic sealing member 71 is moved to facilitate sealing the first and second ends of the pipe 31.

A hydraulic tank 81 and pump 83 supply pressurized hydraulic fluid to the hydraulic sealing member 71 to facilitate sealing the pipe 31 at the first end 37. Receiving pressurized hydraulic fluid causes the hydraulic sealing member 71 to move axially toward the first end 37 of the pipe, thereby moving the first end cap 41 and the first sealing member 43 against the first end 37 of the pipe 31 to form a tight seal. This axial movement, in turn, also causes axial movement of the pipe 31, such that a tight seal is also formed between the second end 39 of the pipe 31 and the second sealing member 53 and the second end cap. A control unit 85 controls the pressure of the hydraulic fluid supplied to the hydraulic sealing member 71 in response to the test pressure sensed by the gauge 82. Thus, the hydraulic pressure required to seal the ends of the pipe 31 is dependent upon the test pressure, thereby substantially preventing undue stress and strain on the end caps and the sealing members. Additionally, deterioration of the sealing members 43 and 53 is substantially prevented, as well as substantially preventing undue axial strain in the pipe 31. The sealing members 43 and 53 may be made of any suitable soft material, such as vulcanized rubber, normally to prevent fluid leakage.

As shown in FIGS. 1A, 2 and 5, the first end cap 41 and the first sealing member are initially disposed adjacent the first end 27 of the mandrel 21. Once the pipe 31 has been disposed on the mandrel 21, the hydraulic sealing member 71 is moved toward the first end 37 of the pipe 31 by pumping hydraulic fluid to the hydraulic sealing member 71 through supply line 72, as shown in FIGS. 1 and 1B. Thus, the first end cap 41 and the first sealing member 43 are forced into a tight fit against the first end 37 of the pipe as well as further strengthening the seal between the second end 39 of the pipe 31 and the second end cap 51 and the second sealing member 53. At least one gasket 58 may be disposed between an inner diameter surface of the first end cap 41 and the outer surface 23 of the mandrel 21, as shown in FIGS. 1A, 1B and 1C.

Figure 1C:
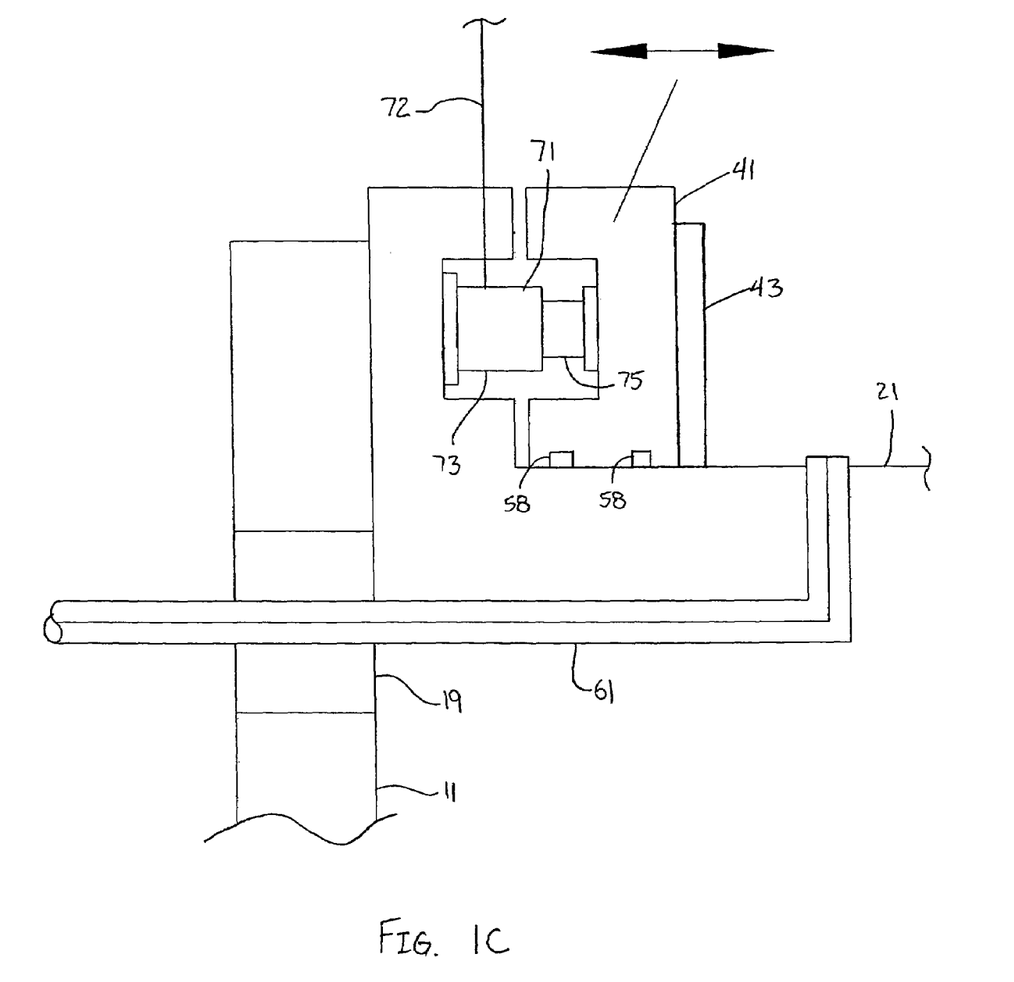
FIG. 1C is an exploded elevational view of the hydraulic sealing member of 1A.

As shown in FIG. 1C, the hydraulic sealing member 71 may be a hydraulically actuated piston. Hydraulic fluid is pumped from the tank 81 by pump 83 to a cylinder 73 of the hydraulic sealing member 71 through supply line 72. The hydraulic fluid received in the cylinder 73 drives the plunger 75 toward a pipe disposed on the mandrel 21. Movement of the plunger 75 also moves the first end cap 41 and the first sealing member 43 toward the pipe (to the right in FIG. 1C, as indicated by the directional arrow), thereby facilitating sealing the first and second ends of the pipe 31. Discharging the hydraulic fluid from the cylinder 73 causes the plunger 75, as well as the first end cap 41 and the first sealing member 43, to move back toward the cylinder and away from the pipe disposed on the mandrel 21 (to the left in FIG. 1C, as indicated by the directional arrow) to facilitate pipe removal.

Figure 3:
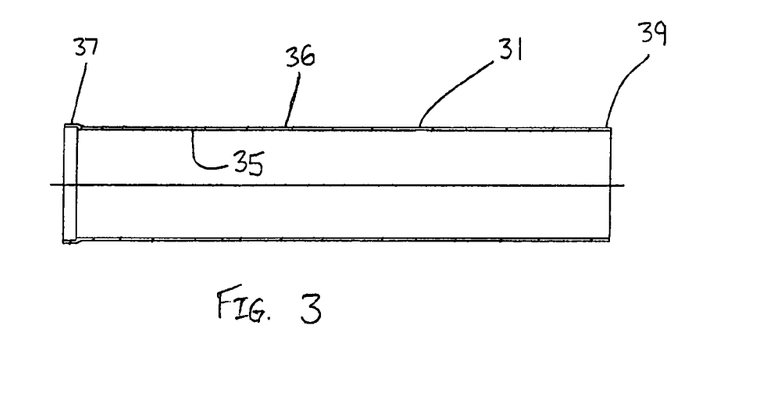
FIG. 3 is a front elevational view in cross-section of a pipe to be tested on the testing apparatus of the present invention.
Figure 4:
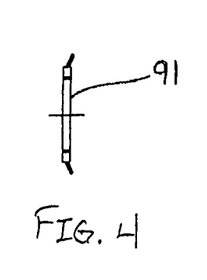
FIG. 4 is a side elevational view of a locking ring for the testing apparatus of the first exemplary embodiment of the present invention.

In a first exemplary embodiment, as shown in the portion above longitudinal line 10 through the mandrel 21 of FIG. 1 and in FIGS. 2-4, the second end cap 51 is disposed on the outer surface 23 proximal a second end 29 of the mandrel 21. A second seal member 53 is disposed on the outer surface 23 of the mandrel 21 between the second end 39 of the pipe 31 and an inner surface 57 of the second end cap 51. Preferably, the second end cap 51 is secured to a support 93, as shown in FIG. 2. A support arm 94 extends outwardly from the support and has a slot 95 therein. A connecting arm 54 connected to the second end cap 51 is received within the slot 95, thereby allowing the second end cap to be rotated toward and away from the second end of 29 the mandrel 21. Furthermore, the slot 95 facilitates longitudinal movement of the second end cap 51 when being moved toward the second end 39 of the pipe 31 by a locking ring 91. Alternatively, as shown in FIG. 1, the second end cap 51 is not connected to a support. Preferably, the second end cap 51 is made of metal.

The locking ring 91 is connected to the second end 29 of the mandrel 21, and is tightened to urge the second end cap 51 and second sealing member 53 into a tight fit against the second end 39 of the pipe 31. The locking ring 91 abuts the outer surface 59 of the second end cap 51. Preferably, the second end 29 of the mandrel is threaded to threadably receive the locking ring 91 thereon.

The second end 29 of the mandrel 21 extends beyond the second end cap 51, second sealing member 53 and the locking ring 91. The second end 29 of the mandrel 21 has a first stepped portion 28 and a second stepped portion 26. The outer diameter of the mandrel 21 is substantially constant other than the first and second stepped portions 26 and 28, such that the outer diameter of the mandrel 21 is larger than the outer diameter of the second stepped portion 26, and the outer diameter of the second stepped portion is larger than the outer diameter of the first stepped portion 28. Preferably, the first stepped portion 28 is threaded to facilitate receiving the locking ring 91. At least one gasket 55 is disposed between an opening 56 in the second end cap 51 and the second stepped portion 26 of the mandrel 21.

In a second exemplary embodiment, as shown in the portion below longitudinal line 10 through the mandrel 121 of FIG. 1 and in FIGS. 5-7, the second end cap 151 is disposed on the outer surface 23 proximal a second end 129 of the mandrel 121. The mandrel 121 of the second exemplary embodiment is substantially similar to the mandrel 21 of the first exemplary embodiment except for the configuration of the second end of the mandrel.

Figure 6:
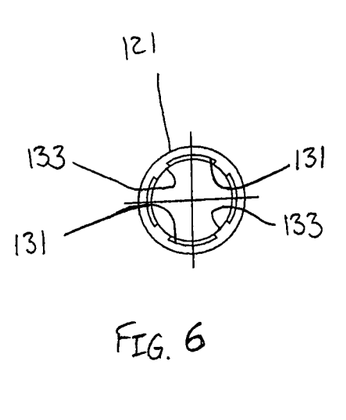
FIG. 6 is a front elevational view of a sealing end of the testing apparatus of FIG. 5.
Figure 7:
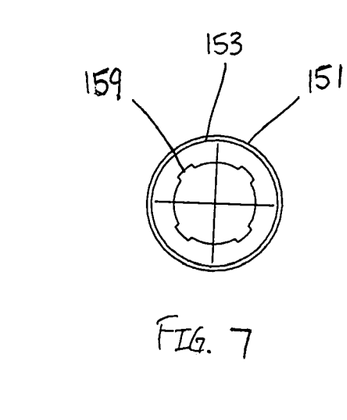
FIG. 7 is a front elevational view of an inner surface of a sealing cap of FIG. 5.

As shown in FIGS. 5 and 6, a plurality of substantially L-shaped arms 133 extend outwardly from the second end 129 of the mandrel 121. The plurality of L-shaped arms 133 are circumferentially spaced apart, as shown in FIG. 6. A recess 131 is formed by the plurality of L-shaped arms 133 at the second end 129 of the mandrel 121, as shown in FIGS. 5 and 6. The second end cap 151 has a first portion 155 from which a plurality of tabs 159 extend radially outwardly, as shown in FIGS. 5 and 7. The plurality of tabs 159 are aligned with the spaces between the L-shaped arms 133 on the mandrel 121 such that the first portion 155 of the second end cap 151 is received within the recess 131 of the mandrel 121, as shown in FIG. 1. A handle 161 on the second end cap 151 is rotated to provide tight engagement between the second end cap 151, the second sealing member 53 and the second end 39 of the pipe 31, as well as to align the plurality of tabs 159 with the spaces between the plurality of L-shaped arms 133. The first end 127 of the mandrel 121 is substantially similar to the first end 27 of the mandrel 21 of the first exemplary embodiment shown in FIGS. 1 and 2.

The second end cap 151 may be connected to a support arm 97, as shown in FIG. 5, to facilitate moving the second end cap toward and away from the mandrel 121. The second end cap is pivotally connected to the support arm 97, such that the second end cap rotates about pivot point 98. The support arm 97 is connected to a support 98. Any suitable method of connecting the second end cap 151 to the support arm 97 may be used, such as the connection method shown in FIG. 2 for the second end cap 51 of the first exemplary embodiment. Alternatively, the second end cap 151 is not connected to a support, as shown in FIG. 1.

The gap 33 is bounded by the first seal member 43, the inner surface of the pipe 31, the second seal member 53, the second end cap 51 and the outer surface 23 of the mandrel 21.

The testing apparatus according to the exemplary embodiments of the present invention may be used to test any pipe, but preferably the pipe is thermoplastic and has a small diameter deviation. Pipe of all diameters can be tested using the testing apparatus of the present invention, but the present invention has particular application to larger diameter pipe. Preferably, the testing apparatus of the present invention is used to test pipe having a diameter between about 18 and 150 inches, but more preferably between about 36 and 120 inches.

Assembly and Operation

A method of internally pressure testing pipe is provided by the exemplary embodiments of the present invention shown in FIGS. 1-7. The pipe 31 to be tested is disposed on an outer surface 23 of a mandrel 21. The pipe 31 is positioned to abut a first sealing member 43 disposed proximal a first end 27 of the mandrel 21. Initially, the first sealing member 43 and the first end cap 41 are disposed in close proximity to the flange at the first end 27 of the mandrel, as shown in FIG. 1A.

A second end cap is then connected to a second end of the mandrel such that a second sealing member 53 is disposed between the second end cap and a second end 39 of the pipe 31, and the second sealing member abuts the second end of the pipe.

As shown in FIGS. 1 and 2, the second end cap 51 of a first exemplary embodiment of the present invention is pivoted downwardly onto the outer surface 23 of the mandrel. The opening 56 in the second end cap creates a friction fit with the second stepped portion 26 at the second end 29 of the mandrel. Movement of the second end cap 51 along the axis of the mandrel 21 is facilitated by the connecting arm 54 being slidably received within the slot 95 in the arm 94 connected to the support 93. The locking ring 91 is then threadably disposed on the first stepped portion 28 at the second end 29 of the mandrel 21 such that the second end cap 51 is disposed between the second sealing member 53 and the locking ring 91. The second end 29 of the mandrel 21 extends beyond the second end cap 51, as shown in FIG. 1. The locking ring 91 is threaded onto the first stepped portion to tightly engage the second end cap 51 and the second sealing member 53 with the second end 39 of the pipe 31.

As shown in FIGS. 1 and 5, the second end cap 151 of a second exemplary embodiment of the present invention is pivoted downwardly and positioned such that the tabs 159 of the first portion 155 of the second end cap 151 are aligned with the spaces between the substantially L-shaped arms 133 at the second end of the mandrel 121. The second end cap 151 is then moved toward the mandrel 121 such that the first portion 155 of the second end cap 151 is received within the recess 131 at the second end 129 of the mandrel 121. The handle 161 is then rotated to tightly engage the second portion 157 of the second end cap 151 and the second sealing member 153 with the second end 39 of the pipe 31. The second portion 157 also abuts the substantially L-shaped arms 133 at the second end 129 of the mandrel 121 such that the second end cap extends beyond the second end of the mandrel.

The first and second ends 37 and 39 of the pipe 31 are then hydraulically sealed by sending hydraulic fluid to a hydraulic sealing member 71 connected to the first end cap 41 to move the first end cap and the first sealing member 43 into tight engagement with the first end 37 of the pipe 31, thereby sealing the first and second ends of the pipe. The hydraulic sealing member 71 is axially movable, such that the hydraulic sealing member presses the first end cap 41 and the first sealing member 43 toward the first end 37 of the pipe 31, as shown in FIGS. 1B and 1C.

A gap 33 is formed between the outer surface 23 of the mandrel 21 and an inner surface 35 of the pipe 31. As the mandrel 21 is removably connected to the frame 11, the mandrel is selected such that such that the gap 33 is approximately five percent of an inner diameter of the pipe 31 to be tested. The gap 33 is filled with a pressurized testing fluid to internally pressure test the pipe 31. A pump 69 may be used to facilitate filling the gap 33 with the testing fluid. The reduced testing volume reduces the required volume of the testing fluid, as well as substantially eliminating the possibility of an explosion due to pipe failure. Furthermore, when water is used as the testing fluid, it is easily disposed of following the test procedure due to the small volume required for the test. The hydraulic pressure required to seal the ends of the pipe is also reduced due to the small size of the gap 33 that is to be sealed.

The testing fluid is supplied from the tank 12 to the gap 33 by lines 61 and 63. Lines 61 and 63 pass through openings 19 in the frame 11 and through the body of the mandrel to the outer surface 23 of the mandrel to supply the gap 33 with testing fluid, as shown in FIGS. 1, 2 and 5. Once the gap 33 is filled with the testing fluid, valves 62 and 64 are closed to prevent further supply of the testing fluid. The test pressure within the gap 33 is then generated by the pressure pump 65. Because valve 64 is closed and valve 66 is open, the pressure is sensed by gauge 82, which is connected to the control unit 85. Thus, the hydraulic pressure controlling the hydraulic sealing member 71 is dependent upon the test pressure of the pipe, thereby substantially preventing undue stress and strain on the end caps, sealing members and the pipe.

Regulations mandate the testing pressure at which the pipe is to be tested and the length of time that pressure is to be held. As noted above, sensing the test pressure to control the hydraulic sealing member 71 reduces the stress and strain on the end caps, sealing members and the pipe.

After the required test pressure has been held for the required length of time, the pressure pump 65 is stopped. The gauge 82 senses the pressure reduction, such that the control unit 85 causes the pump 83 to reduce the hydraulic pressure at the hydraulic sealing member 71 accordingly. When water is used as the testing fluid, valve 68 may be opened to drain the water out. When air is used as the testing fluid, valve 68 may be opened to vent the air to the atmosphere. Alternatively, the testing fluid may be directed back into the tank 12.

Once the gap 33 has been emptied of the testing fluid, the second end cap is removed from the second end of the mandrel. The pipe 31 is then removed from the mandrel. Another pipe of substantially the same diameter may be disposed on the mandrel to conduct another test. Alternatively, a mandrel having a different diameter may be connected to the frame 11 to test another pipe of a different diameter.

While advantageous embodiments have been chosen to illustrate the invention, it will be understood by those skilled in the art that various changes and modifications may be made therein without departing from the scope of the invention as defined in the appended claims.

What is claimed is:

1. An apparatus for internally pressure testing pipe, comprising:
   a frame;
   a mandrel secured to said frame and adapted to receive a pipe thereon such that a gap exists between an outer surface of said mandrel and an inner surface of the pipe;
   a first end cap disposed on said outer surface proximal a first end of said mandrel;
   a second end cap connected to a second end of said mandrel, a first portion of said second end cap being disposed within said mandrel and a second portion of said second end cap abutting said second end of said mandrel;
   first and second seal members disposed between said first and second end caps and the first and second pipe ends, respectively, such that said first and second seal members abut respective ends of the pipe disposed on said mandrel; and
   a line in fluid communication with said gap to fill said gap with a testing fluid.

2. An apparatus for internally pressure testing pipe according to claim 1, wherein
   said line extends through said mandrel and has a supply end in said gap.

3. An apparatus for internally pressure testing pipe according to claim 1, wherein
   said mandrel is selected such that said gap is approximately five percent of an inner diameter of the pipe to be tested.

4. An apparatus for internally pressure testing pipe according to claim 1, wherein
   a hydraulic sealing member is movably disposed between said mandrel and said first end cap, said hydraulic sealing member being connected to a hydraulic pump to facilitate sealing said first and second end caps and said first and second seal members with the pipe.

5. An apparatus for internally pressure testing pipe according to claim 1, wherein
   a friction fit is created between said second end cap and said outer surface of said mandrel.

6. An apparatus for internally pressure testing pipe according to claim 5, wherein
   at least one gasket is disposed between inner surfaces of each of said first and second end caps and said outer surface of said mandrel.

7. An apparatus for internally pressure testing pipe according to claim 5, wherein
   a second end of said mandrel is threaded to facilitate receiving a locking ring on an opposite side of said second end cap as said second seal member.

8. An apparatus for internally pressure testing pipe, comprising:
   a frame;
   a mandrel secured to said frame and having first and second ends, said mandrel being adapted to receive a pipe thereon such that a gap exists between an outer surface of said mandrel and an inner surface of the pipe;
   a first end cap disposed on said outer surface proximal a first end of said mandrel;
   a second end cap connected to a second end of said mandrel;

a first sealing member having a first surface abutting said first end cap and a second surface adapted to abut a first end of the pipe when the pipe is disposed on said mandrel;

a second sealing member having a first surface abutting said second end cap and a second surface adapted to abut a second end of the pipe when the pipe is disposed on said mandrel;

a hydraulic sealing member movably disposed between said mandrel and said first end cap, said hydraulic sealing member being connected to a hydraulic pump to facilitate sealing the first and second ends of the pipe with the first and second end caps and said first and second sealing members; and a line in fluid communication with said gap to fill said gap with a testing fluid.

9. An apparatus for internally pressure testing pipe according to claim 8, wherein
said line extends through said mandrel and has a supply end in said gap.

10. An apparatus for internally pressure testing pipe according to claim 8, wherein
said mandrel is selected such that said gap is approximately five percent of an inner diameter of the pipe to be tested.

11. An apparatus for internally pressure testing pipe according to claim 8, wherein
a first portion of said second end cap is disposed within said mandrel and a second portion of said second end cap abuts said second end of said mandrel.

12. An apparatus for internally pressure testing pipe according to claim 8, wherein
a valve is connected to said line to release testing fluid from said gap.

13. An apparatus for internally pressure testing pipe according to claim 8, wherein
a friction fit is created between said second end cap and said outer surface of said mandrel.

14. An apparatus for internally pressure testing pipe according to claim 13, wherein
at least one gasket is disposed between inner surfaces of each of said first and second end caps and said outer surface of said mandrel.

15. An apparatus for internally pressure testing pipe according to claim 14, wherein
a locking ring is disposed on said outer surface of said mandrel and abuts an opposite side of said second end cap than said second seal member.

16. An apparatus for internally pressure testing pipe according to claim 15, wherein
said outer surface of said mandrel is threaded to facilitate receiving said locking ring.

17. A method of internally pressure testing pipe, including the steps of
disposing a pipe to be tested on an outer surface of a mandrel;
positioning the pipe to abut a first sealing member disposed proximal a first end of the mandrel;
connecting a second end cap to a second end of the mandrel such that a second sealing member is disposed between the second end cap and a second end of the pipe, and the second sealing member abuts the second end of the pipe;
hydraulically sealing the first and second ends of the pipe by sending hydraulic fluid to a hydraulic sealing member connected to the first end cap to move the first end cap and the first sealing member into tight engagement with the first end of the pipe, thereby sealing the first and second ends of the pipe; and
filling a gap between the outer surface of the sleeve and an inner surface of the pipe with a pressurized testing fluid to internally pressure test the pipe.

18. A method of internally pressure testing pipe according to claim 17, further comprising
sensing the test pressure at which the pipe is internally pressure tested; and
controlling the pressure of the hydraulic sealing to substantially prevent undue stress on the first and second end caps and the first and second sealing members.

19. A method of internally pressure testing pipe according to claim 17, further comprising
releasing the hydraulic seals at the first end of the pipe;
removing the second end cap from the second end of the mandrel;
removing the second sealing member from the second end of the mandrel; and
removing the pipe from the mandrel.

20. An apparatus for internally pressure testing pipe, comprising:
a frame;
a mandrel secured to said frame and adapted to receive a pipe thereon such that a gap exists between an outer surface of said mandrel and an inner surface of the pipe;
a first end cap disposed on said outer surface proximal a first end of said mandrel;
a second end cap connected to a second end of said mandrel;
first and second seal members disposed between said first and second end caps and the first and second pipe ends, respectively, such that said first and second seal members abut respective ends of the pipe disposed on said mandrel;
a line in fluid communication with said gap to fill said gap with a testing fluid; and
a hydraulic sealing member movably disposed between said mandrel and said first end cap, said hydraulic sealing member being connected to a hydraulic pump to facilitate sealing said first and second end caps and said first and second seal members with the pipe.

21. An apparatus for internally pressure testing pipe according to claim 20, wherein
said line extends through said mandrel and has a supply end in said gap.

22. An apparatus for internally pressure testing pipe according to claim 20, wherein
said mandrel is selected such that said gap is approximately five percent of an inner diameter of the pipe to be tested.

23. An apparatus for internally pressure testing pipe according to claim 20, wherein
a first portion of said second end cap is disposed within said mandrel and a second portion of said second end cap abuts said second end of said mandrel.

24. An apparatus for internally pressure testing pipe according to claim 20, wherein
a friction fit is created between said second end cap and said outer surface of said mandrel.

25. An apparatus for internally pressure testing pipe according to claim 24, wherein
at least one gasket is disposed between inner surfaces of each of said first and second end caps and said outer surface of said mandrel.

26. An apparatus for internally pressure testing pipe according to claim 24, wherein
a second end of said mandrel is threaded to facilitate receiving a locking ring on an opposite side of said second end cap as said second seal member.

27. An apparatus for internally pressure testing pipe, comprising:
a frame;
a mandrel secured to said frame and adapted to receive a pipe thereon such that a gap exists between an outer surface of said mandrel and an inner surface of the pipe;
a first end cap disposed on said outer surface proximal a first end of said mandrel;
a second end cap connected to a second end of said mandrel, a friction fit being created between said second end cap and said outer surface of said mandrel;
first and second seal members disposed between said first and second end caps and the first and second pipe ends, respectively, such that said first and second seal members abut respective ends of the pipe disposed on said mandrel;
a line in fluid communication with said gap to fill said gap with a testing fluid,
wherein a second end of said mandrel is threaded to facilitate receiving a locking ring on an opposite side of said second end cap as said second seal member.

28. An apparatus for internally pressure testing pipe according to claim 27, wherein said line extends through said mandrel and has a supply end in said gap.

29. An apparatus for internally pressure testing pipe according to claim 27, wherein said mandrel is selected such that said gap is approximately five percent of an inner diameter of the pipe to be tested.

30. An apparatus for internally pressure testing pipe according to claim 27, wherein
at least one gasket is disposed between inner surfaces of each of said first and second end caps and said outer surface of said mandrel.

31. An apparatus for internally pressure testing pipe according to claim 27, wherein
a first portion of said second end cap is disposed within said mandrel and a second portion of said second end cap abuts said second end of said mandrel.

32. An apparatus for internally pressure testing pipe according to claim 27, wherein
a hydraulic sealing member is movably disposed between said mandrel and said first end cap, said hydraulic sealing member being connected to a hydraulic pump to facilitate sealing said first and second end caps and said first and second seal members with the pipe.

* * * * *